UNITED STATES PATENT OFFICE.

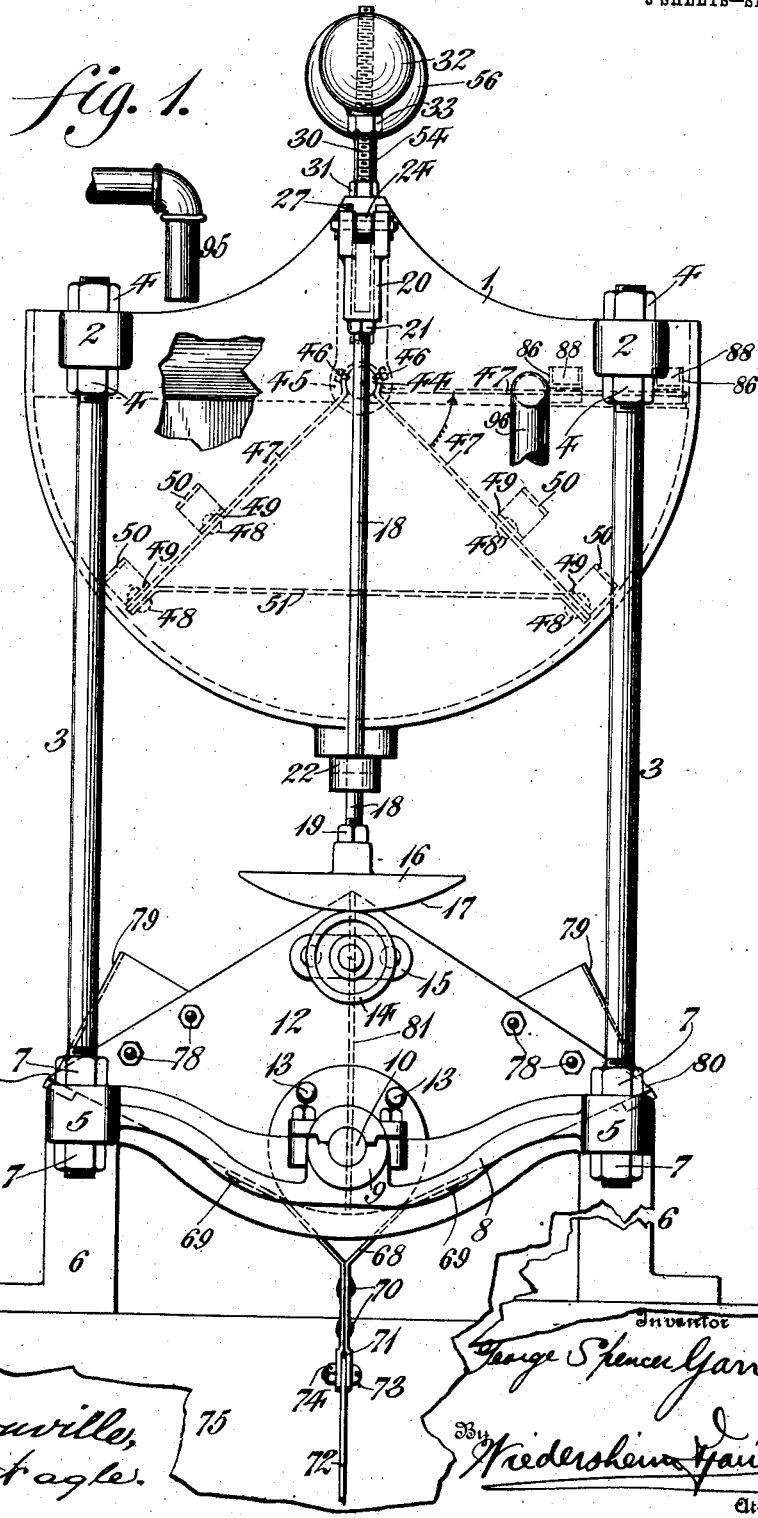

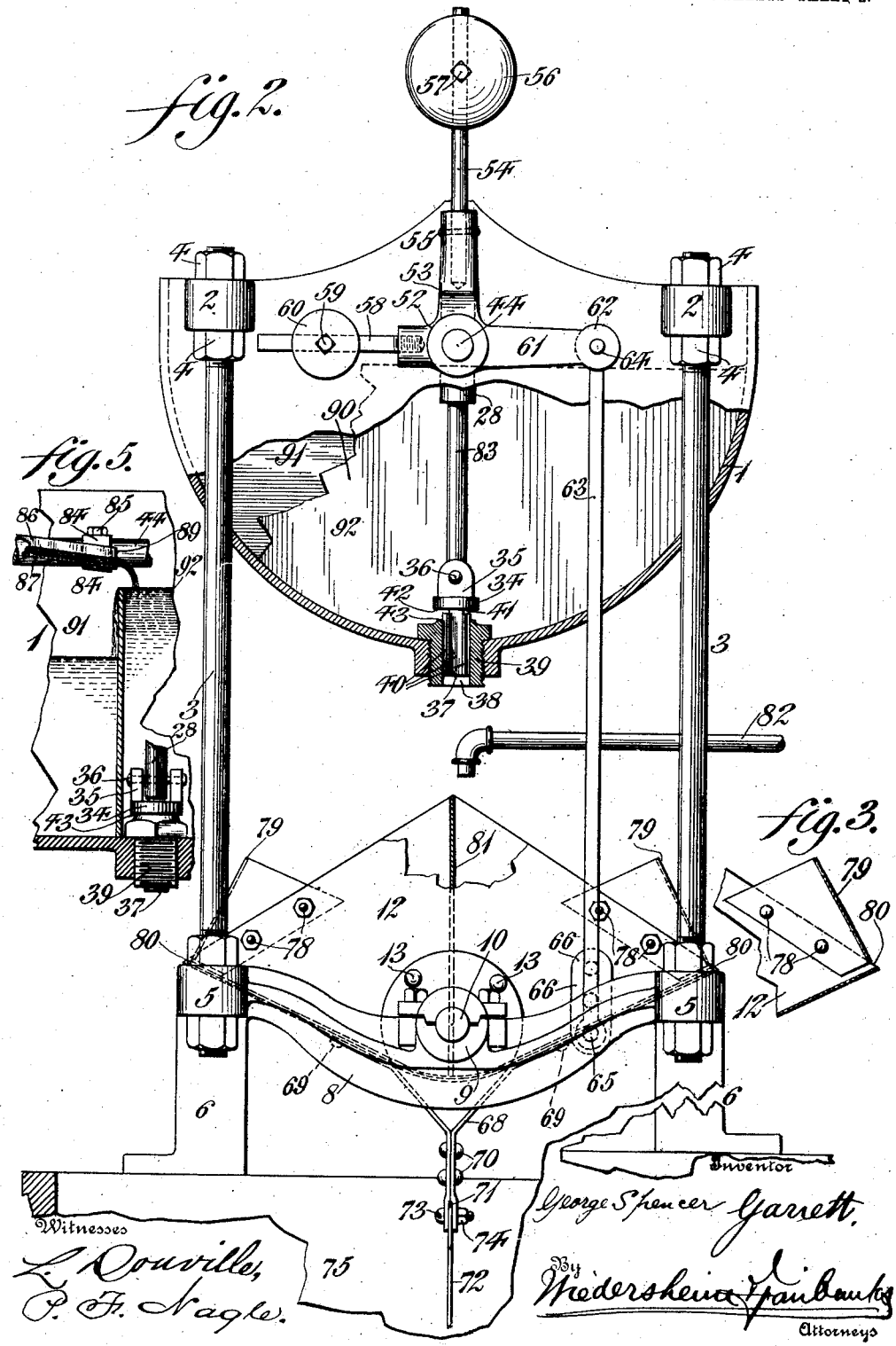

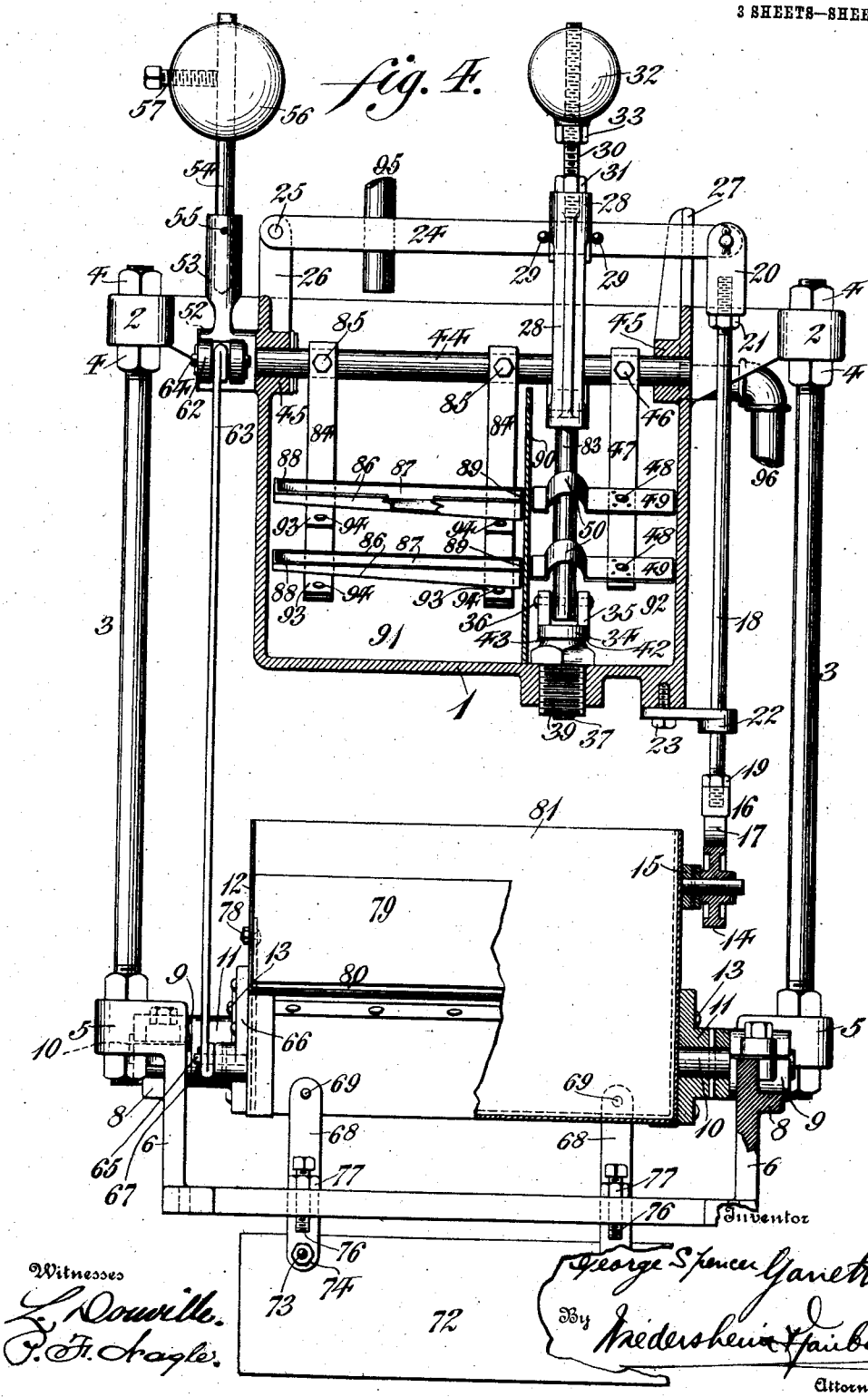

GEORGE SPENCER GARRETT, OF LANSDOWNE, PENNSYLVANIA, ASSIGNOR TO AMERICAN WATER SOFTENER COMPANY, OF PHILADELPHIA, PENNSYLVANIA, A CORPORATION OF NEW JERSEY.

FEED-WATER PURIFIER.

No. 854,160.　　　　Specification of Letters Patent.　　　Patented May 21, 1907.

Application filed August 4, 1906. Serial No. 329,199.

*To all whom it may concern:*

Be it known that I, GEORGE SPENCER GARRETT, a citizen of the United States, residing at Lansdowne, Delaware county, State of Pennsylvania, have invented a new and useful Feed-Water Purifier, of which the following is a specification.

In water softening plants of comparatively small size as ordinarily constructed, an upper tank is periodically filled with the softening solution and the quantity of solution fed therefrom at each opening of the valve decreases as the height of the solution diminishes. In order to overcome this variation in the quantity of solution discharged, I employ a sectional tank and at each oscillation of the oscillating receiver, an agitating device is actuated and an excess quantity of solution is raised thereby in one compartment of the upper tank and discharged into another compartment, the discharge from which is controlled by a suitable valve.

To the above ends my present invention relates to a novel construction of a feed water purifier and consists of a novel construction of an apparatus by the employment of which the quantity of solution discharged from the container at each oscillation is always maintained constant owing to the constant head of solution above the discharge valve.

It further consists of a novel construction of a sectional tank or container, novel means for agitating the liquid contained therein, and novel means for automatically removing a portion of the liquid from one compartment of the tank and discharging it into another compartment thereof.

It further consists of a novel construction of paddles or agitator members which in the present instance are constructed in the form of a trough or provided with longitudinal depressions whereby a portion of the liquid in one compartment of the tank is raised and discharged into another compartment thereof, said members being preferably slightly inclined to the horizontal, in order that the liquid raised thereby may readily flow therefrom.

It further consists of a novel construction of oscillating receiver by means of which the water is gradually discharged therefrom into a suitable receiving tank when said receiver is oscillated.

It further consists of a novel construction of a valve in one of the compartments in the chemical chamber or container and connections between the chemical tank and receiver, whereby the valve in the chemical tank is actuated and simultaneously therewith the chemicals in the chemical tank are stirred or agitated.

It further consists of a novel construction of stirrer or mixer which is actuated by the oscillating receiver and adapted to agitate the liquid in the receiving tank.

It further consists of other novel features of construction, all as will be hereinafter fully set forth.

For the purpose of illustrating my invention, I have shown but one embodiment thereof, since this embodiment best illustrates the principles of the invention and has been found in practice to give satisfactory and reliable results, although it is to be understood that the various instrumentalities of which my invention consists may be variously arranged and organized and still be within the scope of my invention.

Figure 1 represents an end elevation, partly in section, of a feed water purifier embodying my invention. Fig. 2 represents an end elevation, partly in section, showing one end of the apparatus. Fig. 3 represents a perspective view of a portion of the oscillating receiver in detached position. Fig. 4 represents a sectional view of Fig. 1. Fig. 5 represents a sectional elevation of a portion of Fig. 4, showing certain of the parts in different relation to each other.

Similar numerals of reference indicate corresponding parts in the figures.

Referring to the drawings. 1 designates a chemical tank or container having outwardly extending lugs 2 through which pass the standards or uprights 3, which are held in suitable relation with respect to the lugs 2, by means of lock nuts 4. The other ends of the standards 3 pass through lugs 5 extending from supports 6, said standards being held in suitable relation with said lugs by means of lock nuts 7.

8 designates cross arms or flanges mounted on the support 6 and on which are located the journals 9.

10 designates a shaft mounted in the journals 9 in a bearing 11 secured to an oscillating receiver 12 by means of bolts or rivets 13.

14 designates a roller rotatably mounted in a bracket 15 suitably secured to one side of the oscillating tank 12, preferably in the same vertical plane as its pivotal point and adapted to coact with a cam block 16 having an operative face 17.

18 designates a rod or lever, one end of which has threaded engagement with the cam block 16 and is retained in its adjusted position by means of a lock nut 19. The other end of the rod 18 has threaded engagement with a cross-head 20 and is retained in its adjusted position by means of the lock nut 21. The rod 18 is guided in a bracket 22 suitably secured to the chemical tank 1 by means of a cap screw or equivalent device 23.

24 designates a lever, one end of which is pivoted to the cross head 20, the other end thereof being fulcrumed at 25 to an upright or standard 26 rising from the chemical tank 1. One side of the tank is suitably slotted or recessed as at 27, in order to allow for the movement of the lever 24. The lever 24 passes through a valve yoke 28 and is held in suitable relation therewith by means of pins or equivalent devices 29 secured to the lever 24.

30 designates a screw having threaded engagement with the valve yoke 28 and provided with a lock nut 31, said screw having mounted thereon a weight 32, which may be adjusted as desired by means of a nut 33.

34 designates a valve block provided with a fork 35 in which one end of a valve rod 83 is pivoted, as at 36, the other end of said block 83 being secured to the valve yoke 28. This valve 34 has a reduced end 37 which fits a chamber 38 in a closure 39, which has threaded engagement with the casing of the chemical chamber which is suitably enlarged or strengthened at this point.

40 designates grooves in the valve stem 37 which communicate with an annular groove or recess 41 located between a shoulder 42 and said valve stem, said shoulder 42 being adapted to be seated against a seat 43 on the closure 39.

44 designates a shaft journaled at 45 in the casing of the chemical tank 1. 46 designates a set screw or equivalent device by means of which the agitator arms 47 are secured on the shaft 44, said arms 47 being riveted or otherwise secured thereto at 48 by one or more cross arms 49, which are bent or deflected as at 50, in order that said cross arms may pass beyond the vertical plane of the valve stem 28. The agitator arms 47 may be suitably stiffened or braced by means of bars 51 secured thereto or to the cross-arms 49.

84 designates agitator arms similar to the arms 47 and preferably constructed of an integral piece of material bent around the shaft 44 and secured thereto by suitable fastening devices 85.

86 designates the combined paddle and lifting members or blades which in the present instance are longitudinally recessed as at 87 to form a trough, one end 88 being closed and the opposite end 89 contiguous the diaphragm or partition 90 being open, in order that the solution raised by the members 86 will be discharged from the chamber or compartment 91 into the chamber or compartment 92. The members 86 are provided in the present instance with flanges or lugs 93 which are secured to the arms 84 by means of suitable fastening devices 94, although it will be apparent that the flanges 93 may be dispensed with if desired and the members 86 fastened directly to the arms 84. The members 86 are preferably secured to the arms 84 in such a manner that they incline from the horizontal and toward the diaphragm 90, in order that the solution will freely discharge into the compartment 92 when the members 86 are raised above the top of the diaphragm 90.

52 designates an angle block or elbow having an upwardly extending arm 53 to which is secured a rod 54 by means of a pin or bolt 55.

56 designated a weight adjustably mounted on the rod 54 by means of a set screw 57.

58 designates a rod having threaded or other engagement with the elbow 52 and having adjustably secured thereto by means of a set screw 59, a weight 60.

61 designates an arm preferably in alinement with the rod 58 and recessed at its outer end so as to form a fork 62 to which one end of a connecting rod 63 is secured by means of a pin 64. The other end of the bar or rod 63 is mounted on a pin 65 carried by a bracket 66 suitably secured to the container 12 and is held in place in the present instance by a cotter pin 67, although it is apparent that it may be otherwise connected with the container 12 and still be within the scope of my invention.

I may if desired, employ a plurality of pins 65 located in different planes as seen in dotted lines in Fig. 2 in order that the amount of movement given to the agitating device in the chemical tank may be regulated according to requirements.

68 designates supporting arms secured at 69 to the container or tipper 12, said arms being riveted or bolted together as at 70 and deflected or bent outwardly at their outer ends so as to form a slot or chamber 71 in which a stirring blade 72 is secured by means of a bolt 73 and nut 74. This stirrer is adapted to move in the receiving tank 75 located under the container 12.

76 designates screws having lock nuts 77, said screws passing through the supporting members or frame 6. In oscillating containers as ordinarily constructed, the liquid escapes in almost a solid body so that it does not mix as it should with the liquid in the receiving tank 75. To overcome this, I secure to the oscillating tank 12 by bolts or rivets 78, a hood or closure 79 which is so arranged that a narrow space 80 is left open between the hood and the contiguous side of the receiver 12, in order that the liquid will empty in a sheet like form into the receiving tank 75 and be more intimately mixed with the liquid therein than if the liquid in the container 12 was discharged in a substantially solid liquid body.

The receiver 12 has a diaphragm 81 which divides the same into two receptacles of equal capacity.

95 designates a conduit discharging into the chamber 91 and by means of which the chemical solution is placed therein. In order to permit the solution in the chemical container 1, when the solution in the chambers 91 and 92 is above the diaphragm or partition 90, to overflow from the tank 1, I provide in the present instance an overflow pipe 96 which is located at the same height as the diaphragm or partition 90.

The operation will be readily apparent. The feed water entering through the pipe 82 causes one of the receptacles to be filled which will cause the oscillating receiver 12 to tip until it strikes the screws 76. The cam 16 coacting with the roller 14 will cause the rod 18 to move upwardly thus raising the lever arm 24 which will cause the shoulder 42 to be raised above its seat 43. The chemical reagent contained in the tank 1 may now pass around the annular groove 41 and through the grooves 40 and fall into one of the receptacles in the oscillating receiver 12 into which the water is now flowing through the pipe 82. When one of the receptacles in the receiver 12 is filled to the desired extent, the weight of the liquid therein will cause said receiver to tip until it is stopped by striking against the screws 76. As the receiver 12 oscillates, the arm 63 connected therewith and with the counterbalance support 52 will cause the shaft 44 to be rocked. The arms 84 carried by the shaft 44 will be raised and the agitator and lifting members 86 will be raised above the diaphragm or partition 90. The solution raised by the members 86 will discharge into the compartment 92 of the chemical tank 1 so that at each oscillation of the receiver 12 the solution will not only be suitably agitated in the compartment 91 but a portion thereof will be lifted therefrom and discharged into the compartment 92. The solution in the chamber or compartment 92 will be suitably agitated by means of the arms 47 and the paddles or blades 49 carried thereby. The compartment 92 always stays filled and the excess solution is permitted to freely flow over the top of the diaphragm 90 into the compartment 91. The liquid in the receiving tank 75 will be stirred or moved by the blade 72 located therein and which is carried by the oscillating receiver 12 and moves therewith.

It will be apparent that in my novel construction the amount of movement given to the valve may be varied as desired by adjusting the rod 18. The screw 30 has threaded engagement in the valve yoke 28 and if this member 30 is screwed in its full length, it will engage the bar 24 and the valve 34 is raised its full distance. If, however, the valve rod 30 is raised the lever 24 will be permitted to rise a desired distance before the valve member 34 is actuated. It will thus be apparent that the throw of the valve may be adjusted not only by adjusting the rod 18 but also by adjusting the screw 30.

It will be further apparent that by pivoting the lever or connecting arm 63 at a different point on the receiver and by adjusting the weights 56 and 60 with respect to the counterbalance bracket 52, the amount of rotation given to the agitating device in the chemical tank 1 may be varied according to requirements and also that by deflecting the cross arms as at 50, the said arms will be permitted to pass through the vertical plane of the valve stem 28.

It will be further apparent that the hoods 79 will leave only a small opening between their outer edge and the contiguous face of the receiver 12 so that the liquid will be discharged in such a manner that it will be more intimately mixed or commingled with the liquid in the receiving tank 75.

It will now be apparent from the foregoing that I have produced a novel and useful construction of a feed water purifier which embodies the features of advantage enumerated in the statement of invention and the above description and while I have in the present instance shown and described the preferred embodiment thereof, it is to be understood that it is susceptible of modification in various particulars without departing from the spirit and scope of the invention or sacrificing any of its advantages.

It will be apparent that while in the present instance I have preferred to show the oscillating receiver 12 as being located below the chemical container 1, it is apparent that this receiver may be located adjacent to or in alinement with said container and still be within the scope of the invention.

Having thus described my invention, what I claim as new and desire to secure by Letters Patent, is:—

1. In a water purifier, a chemical tank having an opening therein, a reciprocatory valve for said opening located in said tank, an oscillating receiver and means embodying a rocker arm and a positive connection actuated by said receiver for maintaining a constant head above said valve.

2. In a water purifier, a sectional chemical tank having a discharge opening in one section thereof, a valve for said opening, an oscillating receiver, and oscillatory means positively connected with and actuated by said receiver for removing solution from one section and discharging the same into the valve-containing section to maintain a constant head above said valve.

3. In a water purifier, a container having a diaphragm therein dividing the same into a plurality of compartments, one of said compartments having a valve controlled discharge opening therein, a shaft mounted in said container, an agitating device mounted on said shaft and extending into the valve containing compartment, arms carried by said shaft extending into the other of said compartments, combined agitating and raising members carried by said arms and inclined to the horizontal, and means for rocking said shaft to cause said combined agitating and raising members to discharge the liquid into said valve containing compartment.

4. In a water purifier, a container having a diaphragm therein dividing the same into a plurality of compartments, one of said compartments having a valve controlled discharge opening therein, a shaft mounted in said container, arms carried by said shaft, trough-shaped lifting member carried by said arms and inclining toward said diaphragm, the ends of said members contiguous said diaphragm being open, and an oscillating receiver operatively connected with said shaft for actuating the same.

5. In a water purifier, a sectional container having an opening in one section thereof, a valve for said opening, a shaft journaled in said container, an agitating device mounted on said shaft and extending into the valve containing section, a combined agitator and liquid raising device mounted on said shaft for raising liquid from one section and discharging said liquid into the valve containing section, and means for actuating said shaft.

6. In a water purifier, a container having a partition therein dividing the same into a plurality of compartments, one of said compartments having a valve controlled opening therein, a shaft journaled in said container, an agitating device carried thereby and located within said valve containing compartment, a combined agitating and lifting device carried by said shaft and adapted to discharge the liquid raised thereby into said valve containing compartment, an oscillating receiver, and means actuated thereby for actuating said shaft.

7. In a device of the character described, a sectional container having an opening in one section thereof, a valve for controlling said opening, an oscillating receiver, a combined agitator and liquid-raising device in one compartment of said container, a roller mounted on said receiver, a cam co-acting with said roller and connections between said cam and said valve for controlling the latter.

8. In a device of the character described, a sectional container having an opening in one section thereof, a valve for controlling said opening, an oscillating receiver, a combined agitator and liquid-raising device in one compartment of said container, a roller carried by said receiver, a cam coacting with said roller, connections between said cam and said valve for controlling the latter and an adjustable weight carried by said connections.

9. In a device of the character described, a sectional container having an opening in one section thereof, a valve for controlling said opening, an oscillating receiver, a combined agitator and liquid-raising device in one compartment of said container, a roller carried by said receiver, a cam co-acting with said roller, connections between said cam and said valve for controlling the latter, and a hood secured to said receiver whereby the fluid contained therein is gradually discharged therefrom on the oscillation thereof.

10. In a device of the character described, a sectional container having an opening in one section thereof, a valve for said opening, an oscillating receiver, a combined agitator and liquid-raising device in one compartment of said container, a roller carried by said receiver, a cam co-acting with said roller and adapted to actuate said valve, a shaft journaled in said container, an agitating device mounted thereon, and a connection between said shaft and said receiver whereby the oscillation of the latter actuates said shaft.

11. In a device of the character described, a sectional container having an opening in one section thereof, a valve for said opening, an oscillating receiver, a combined agitator and liquid-raising device in one compartment of said container, a roller carried by said receiver, a cam co-acting with said receiver and adapted to actuate said valve, a shaft journaled in said container, an agitating device mounted thereon, a connection between said shaft and said receiver, whereby the oscillation of the latter actuates said shaft, a tank into which said receiver discharges, and a stirring plate carried by said receiver and extending into said tank.

12. In a device of the character described, a sectional container having an opening in one section thereof, a valve for controlling said opening, an oscillating receiver, a combined agitator and liquid-raising device in one compartment of said container, a roller mounted on said receiver, a cam co-acting with said roller, connections between said cam and said valve for controlling the latter, and means for adjusting said connections.

13. In a device of the character described, a sectional container having an opening in one section thereof, an apertured valve seat in said opening, a valve therefor, an oscillating receiver, a roller carried by said receiver, a cam co-acting with said roller, connections between said cam and said roller for actuating said valve, hoods carried by said receiver for regulating the liquid discharged therefrom, a tank into which said receiver discharges, a shaft journaled in said container, an agitating device mounted thereon, in one compartment of said container, a combined agitator and liquid-raising device on said shaft in the other compartment a connection between said shaft and said receiver, and means carried by the latter for agitating the liquid in said tank.

14. In a device of the character described, a sectional container having an opening in one section thereof, a valve for controlling said opening, an oscillating receiver, a roller carried by said receiver, a cam co-acting with said roller, connections between said cam and said valve for controlling the latter, an agitating device journaled in said container in one compartment thereof, a combined agitator and liquid-raising device on said shaft in the other compartment, and connections between said device and said receiver, whereby the oscillation of the latter actuates said valve and said agitating device.

15. In a device of the character described, a sectional container having an opening in one side thereof, a valve controlling said opening, an oscillating receiver, a roller carried by said receiver, a cam co-acting with said roller, adjustable connections between said cam and said valve for actuating the latter, a shaft journaled in said container, an oscillatory agitating and liquid-raising device carried thereby, a lever mounted on said shaft, connections between said lever and said oscillating receiver, and an adjustable weight carried by said lever.

16. In a device of the character described, a sectional container having an opening in one section thereof, a shaft journaled therein, arms mounted on said shaft, cross arms carried thereby and having deflected portions, a lever mounted on said shaft, a plurality of adjustable weights carried by said lever, an oscillating receiver, a combined agitator and liquid-raising device in one compartment of said container, a connection between said lever and said receiver, a valve for controlling the opening in said container, a valve stem therefor, a lever pivoted to said container and in connection with said valve stem, an adjustable weight carried by said valve stem, a cam in connection with said valve lever, and means carried by said receiver for actuating said cam.

17. In a device of the character described, a sectional container having an opening in one section thereof, a valve seat in said opening, a valve adapted to control said opening, said valve having a reduced end provided with longitudinal grooves, said valve having an annular groove in its upper end, an oscillating receiver, a roller carried thereby, a cam co-acting with said roller, a valve stem for said valve, connections between said stem and said cam, an agitating and liquid-raising device having cross arms journaled in said container and adapted to pass the vertical plane of said valve stem, and means connected with said receiver and with said agitating device whereby the same is actuated on the oscillation of said receiver.

18. In a water purifier, a chemical tank, an oscillating receiver, means actuated by said receiver for maintaining a fixed amount of liquid in said tank, and a combined agitator and liquid-raising device positively connected with said receiver for automatically removing a desired amount of liquid from said tank.

19. In a water purifier, a chemical tank having a plurality of compartments, means for conducting a liquid to one of said compartments, an overflow for said tank, an oscillatory combined agitating and raising device positively connected with said receiver for removing liquid from one compartment and discharging the same into another compartment, and means for removing liquid from said last named compartment.

GEORGE SPENCER GARRETT.

Witnesses:
JOHN A. WIEDERSHEIM,
HERBERT S. FAIRBANKS.